Jan. 17, 1961     M. J. DAVIS     2,968,169

STRAP COUPLING

Filed April 1, 1959

INVENTOR.
MANUEL J. DAVIS
BY
L. J. Larrabee
his ATTORNEY.

United States Patent Office 2,968,169
Patented Jan. 17, 1961

2,968,169
STRAP COUPLING
Manuel J. Davis, Los Angeles, Calif.
Filed Apr. 1, 1959, Ser. No. 803,433
6 Claims. (Cl. 64—15)

My invention relates to coupling devices for shafts and is of the kind permitting a certain amount of misalignment between the coupled shafts and known as flexible couplings.

Shafts of heavy equipment are usually very carefully aligned but in small equipment such as that powered by fractional H. P. motors, misalignment may readily occur in assembling the small parts and may cause serious trouble because of the small driving torque leaving little margin for loss of power.

The present trend to miniaturization in instruments has greatly increased the field of usefulness of mechanisms adapted to be incorporated in such equipment and considerations of simplicity of construction, minimum need for maintenance, absence of frictional losses, and the like, with small size and weight are of great importance.

It is an object of my invention to provide a novel flexible coupling of small size and weight and having no loose or sliding parts, the coupling when made up requiring no attention throughout its life and which will reduce power loss to a minimum that may be occasioned by misalignment of the connected shafts.

A further object of my invention is to provide a novel miniature coupling that will operate successfully notwithstanding angular misalignment as well as a lack of axial alignment of the shafts it connects.

Another object of my invention is to provide a novel flexible shaft coupling of maximum simplicity and which is inexpensive and may be easily installed.

A still further object is to provide a novel flexible strap coupling whereby a maximum of flexibility of the coupling is accomplished to afford a novel device for connecting shafts with a minimum amount of power loss resulting between the drive and driven shafts.

Yet another object of my invention is to provide a novel strap coupling whereby there will be practically no loss of driving torque between the drive and driven shafts.

Other objects, advantages and features of invention, may appear from the accompanying drawing, the subjoined detail description, and the appended claims.

The accompanying drawing illustrates the invention in some of the forms that I at present deem preferable.

Figure 1:
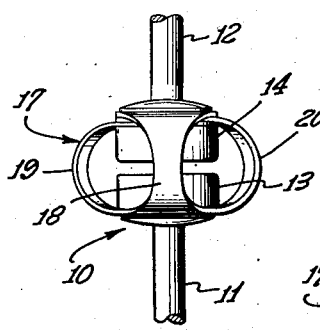
Figure 1 is an elevational view of one form of my invention.
Figure 3:
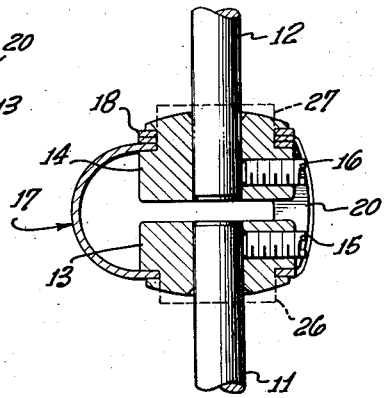
Fig. 3 is a sectional view taken on line 3—3, Fig. 2, but drawn on a larger scale.

Referring now to Fig. 1 of the drawing, the numeral 10 generally indicates the flexible coupling connecting two shafts 11 and 12 through hubs 13 and 14 immovably mounted on said shafts. As shown in Fig. 3 the hubs 13 and 14 are adapted to be secured to facing ends of shafts 11 and 12 by set screws 15, 16 and the hubs 13 and 14 are connected together by the member 17 shown in Fig. 4, parts of this member being immovably secured to each of the hubs 13 and 14.

The member 17 is stamped out of thin resilient sheet, such as beryllium copper, stainless steel, or the like, and formed with three arms 18, 19 and 20 radiating from a center section 21. Holes 22, 23, 24 and 25 are cut out by the stamping die in the center section and at the enlarged outer ends of the arms 18, 19 and 20. The holes being sized to closely fit over the reduced diameter extensions 26, 27 indicated in dotted lines in Fig. 3, of the hubs 13, 14.

The center hole 22 is placed over the extension 26 of hub 13 and the extension 26 is then riveted, spun or peened over the metal around the hole 22, the member 17 being thus immovably secured to the hub 13. Arms 18, 19 and 20 are then bent upwardly and inwardly and the holes 23, 24 and 25 positioned over extension 27 of hub 14, the extension 27 being then spun or peened over the metal around the holes, thus immovably securing the arms 18, 19 and 20 to hub 14.

Figure 2:
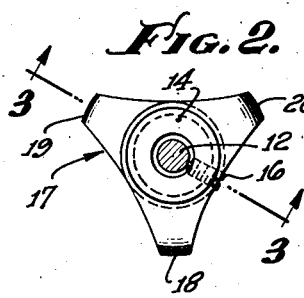
Fig. 2 is a plan view of the form of the invention shown in Fig. 1.

The coupling so constructed is self supporting with no loose parts and of minimum size and maximum simplicity and experiences practically no deterioration in use. The resilient member 17 may also be formed as shown at 17a in Fig. 5 in which the arms 28, 29 and 30 are formed as an elongated unitary member and are made with holes 31, 32, 33 and 34 of which holes 31 and 33 may fit over the extension 26 of hub 13 and holes 32 and 34 may fit over extension 27 of hub 14. The resulting coupling when seen in plan will look as shown in Fig. 2 but two thicknesses of the resilient member will be spun or peened to hub 13 and two thicknesses to the other hub 14.

Figure 4:
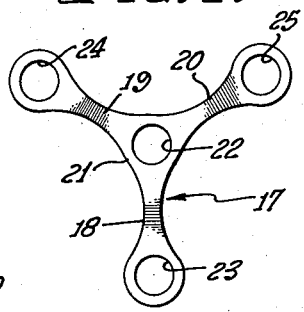
Fig. 4 is a plan view of a resilient strap element incorporated in the coupling shown in Fig. 1.
Figure 5:
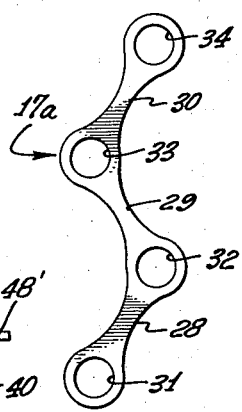
Fig. 5 is a plan view of an alternate form of a resilient strap element.
Figure 6:
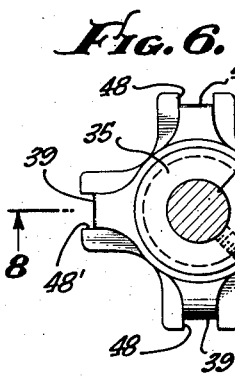
Fig. 6 is a plan view of another embodiment of my invention.
Figure 8:
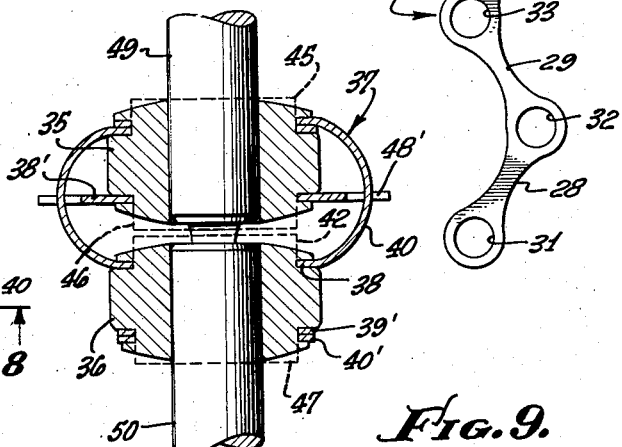
Fig. 8 is an enlarged sectional view taken on line 8—8, Fig. 6.
Figure 7:
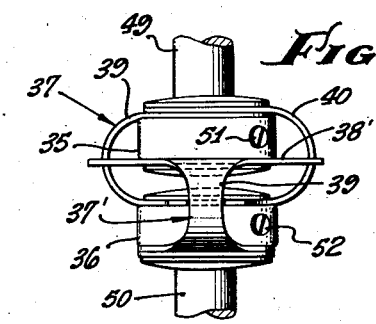
Fig. 7 is an elevational view of the coupling shown in Fig. 6.

Obviously two resilient members of the form shown in Fig. 4 or 5 may be used instead of one, the bowed portions then being preferably arranged intermediate one another.

Figure 9:
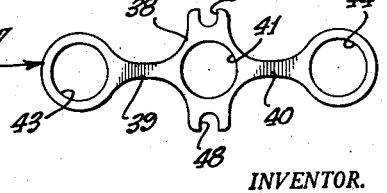
Fig. 9 is a plan view of one of the resilient strap elements comprised in the coupling shown in Figs. 6 to 8 inclusive.

In Figs. 6 through 9 a flexible coupling is shown in which hubs 35 and 36 are provided with extensions at both inner and outer ends and two unitary resilient members of the form indicated at 37 in Fig. 9 are utilized, the second member being given the same numerals with the addition of a prime (').

The member 37 comprises a central portion 38 with laterally extending arms 39 and 40. The central portion 38 is provided with a hole 41 which is fitted over the inner projecting extension 42 of hub 36, and with holes 43 and 44 in the enlarged outer ends of arms 39 and 40, the holes 43 and 44 being placed over the outer projecting extension 45 of hub 35.

A second resilient member identical with member 37 is fitted with the hole in its central portion 38' over the inner projecting extension 46 of hub 35 and with the holes in the enlarged ends 39' and 40' over the outer projecting extension 47 of hub 36. The inner and outer projections of hubs 35 and 36 are of less diameter than the body of the hubs so that when the outer ends are riveted, spun or peened over the resilient members mounted on the projections, a solid assembly with no radial movement between the resilient members and hubs is produced, The peening or riveting or spinning of the hub projections over the resilient members positioned on them may be effected by any suitable procedure available to those skilled in the art.

In order to reduce or eliminate distortion of the strips of resilient material extending between the hubs under high torque, I may form notches 48, and 48' in the center portion of the members inter-fitting with the arms of the other resilient member.

Shafts 49 and 50 are shown on the facing ends of which hubs 35 and 36 are securely fixed by set screws 51, 52.

Shafts of different diameters may be connected by the flexible coupling of my invention by drilling holes of the required diameter in the hubs, and the hubs may be made from metal or a suitable plastic or nylon, and the resilient member of a suitable metal or metal alloy free from deterioration from crystallization caused by rapid vibrations.

It may be mentioned that couplings constructed in accordance with my invention for use in miniaturized instrumentation were tested under working conditions and no perceptible wear or deterioration was found after hundreds of millions of revolutions at thousands of revolutions per minute and under load.

Preferred embodiments of my invention have been described and shown herein by way of illustration but not as limitations of the invention since various modifications may be made therein by those skilled in the art without departing from the scope of the invention as defined in the appended claims.

I claim:

1. A flexible coupling for the facing ends of a pair of shafts, comprising: a pair of hubs, each having a body and a reduced diameter portion; means for rigidly securing said hubs on facing ends of said pair of shafts with the reduced diameter portion on said hub being on the side of said hub lying away from the facing ends of said shafts; and integrally formed elements of resilient thin material having holes formed therein to receive the reduced diameter portions of said hubs and being integrally secured to said hubs.

2. A flexible coupling comprising: a pair of hubs adapted to be mounted on the facing ends of a pair of shafts, each hub having a body portion and a reduced diameter portion at one end; and an integral member of resilient thin material having a central portion with arms of equal length projecting therefrom, said central portion having a centrally located hole adapted to receive the reduced diameter portion of one hub, and said projecting arms each having a hole adapted to receive the reduced diameter portion of the other hub, said reduced portions of the hubs being secured over the resilient member fitted thereon.

3. A flexible coupling as set forth in claim 2, and in which said integrally formed resilient member comprises: a central section formed with a hole fitting over the reduced diameter portion of one hub, and three equally spaced arms of equal length projecting from said central portion, each of said arms being formed at its ends with a hole adapted to fit over the reduced diameter portion of the hub, the reduced diameter portions being secured to the material surrounding them to provide a one piece coupling assembly.

4. A flexible coupling as set forth in claim 2, and in which said integrally formed resilient member comprises an elongated strip of material formed to provide three arms of equal length in equal angular relation to one another, the angle between the first and second arm being in one direction, and the angle between the second and third arms being in the opposite direction, there being holes provided in the outer ends of the end arms and a hole being provided at the junctions of each end of the outer arms with the center arm, alternate pairs of holes being fitted onto one hub and the other alternate pair of holes being fitted onto the second hub.

5. A flexible coupling comprising: a pair of hubs adapted to be secured on the facing ends of a pair of shafts, the inner and outer ends of each hub geing provided with extensions of reduced diameter; and a pair of unitary resilient members of sheet material, each having a central portion and oppositely extending arms of equal length, the center portions and the ends of said arms being provided with holes, the central hole of each resilient member being fitted over the reduced diameter portion of one hub and the holes in the ends of the arms being fitted over the outer reduced diameter portions of the other hub, all of said reduced diameter portions being secured to the resilient material around them to produce a unitary flexible coupling.

6. A flexible coupling as set forth in claim 5, and in which the center portion of the resilient members are extended transversely of the axis of the member and provided with opposite notches which in assembled position in the coupling interfit closely with the arms of the other member.

References Cited in the file of this patent

UNITED STATES PATENTS

| | | |
|---|---|---|
| 1,214,307 | Hosford | Jan. 30, 1917 |
| 1,392,342 | Laycock | Oct. 4, 1921 |
| 2,591,769 | Beechler | Apr. 8, 1952 |
| 2,724,251 | Weaver | Nov. 22, 1955 |